July 20, 1965 J. T. FRANKS, JR 3,196,280

MULTI-APERTURE LOGIC ELEMENT

Filed Nov. 30, 1961 2 Sheets-Sheet 1

INVENTOR.
JOHN T. FRANKS JR.
BY
ATTORNEY

July 20, 1965 J. T. FRANKS, JR 3,196,280

MULTI-APERTURE LOGIC ELEMENT

Filed Nov. 30, 1961 2 Sheets-Sheet 2

INVENTOR.
JOHN T. FRANKS JR.
BY A H Oldham
ATTORNEY

United States Patent Office 3,196,280 Patented July 20, 1965

3,196,280

MULTI-APERTURE LOGIC ELEMENT

John T. Franks, Jr., Akron, Ohio, assignor to Goodyear Aerospace Corporation, Akron, Ohio, a corporation of Delaware Filed Nov. 30, 1961, Ser. No. 155,900
7 Claims. (Cl. 307—88)

The present invention relates to magnetic memory devices capable of performing the logical equality function operation $A \cdot B \; U \; \bar{A} \cdot \bar{B}$ and more particularly to improvements in multi-aperture magnetic ferrite cores.

Magnetic materials that possess the characteristic of retaining information either in positive or negative magnetic remanent states can be used to store signals. A winding coupled to such a magnetic material, when carrying a current of a given polarity, drives the magnetic material to its positive saturation level. When the driving current terminates the magnetic material settles back to its positive remanent state. The same winding or a second winding, when carrying current of an opposite polarity, drives the magnetic material to its negative saturation state. When the driving current terminates the magnetic material settles back to its negative remanent state.

A toroidal core of magnetic material having a rectangular hysteresis loop may be caused to attain one or the other of its stable remanent flux states to thereby represent information. A change from one flux state to the other flux state destroys the information stored in the core. This change in the magnetic flux pattern induces a voltage in a sense winding thereby creating an output signal.

Multipath magnetic cores have been developed to sense the storage condition of the core without destroying this condition. These cores are known as non-destructive readout elements and basically operate in substantially the same mode as the toroidal core.

The transfluxor is a multiple flux path device which includes a body of magnetic material having the characteristic of being substantially saturated at remanence. The body has two or more apertures defining a plurality of distinct flux paths. One of the flux paths includes two different portions of magnetic material. Each of the two portions is in common with each of two other flux paths. By applying suitable excitation currents to windings linking the other flux paths, the two common portions of the flux path can be set to the same or to opposite flux states. When the two common portions are in the same flux state an output signal can be induced in the output winding by a signal applied to a winding linking the flux path. When the two common portions are in an opposite flux state, a signal cannot be induced in the output winding by a signal applied to a winding linking the flux path. The transfluxor has two magnetic response conditions i.e. the input signal blocked and the input signal transmitted.

Prior multipath magnetic cores have not been developed to perform the logical equality function operation $A \cdot B \; U \; \bar{A} \cdot \bar{B}$ all within the magnetic material and still retain the property of non-destructive readout. Memory circuits having diodes, transistors or relays and magnetic cores have been constructed to perform said logical operation. These circuits have the disadvantages of being bulky, of consuming large amounts of power and of having slow speeds.

The invention includes a multi-aperture logical element, hereinafter identified as a MALE, having separate flux paths defined by four separate legs of the MALE. The flux paths associated with two of the legs are saturated by a bias means. The direction of the flux pattern in the other flux paths is controlled by input means and indicates the storage of information. A readout or sense means links the flux paths associated with the said two of the legs. Read means magnetically coupled to an unbiased leg switches the direction of the flux in one of the said two of the legs in accordance with the flux path established by the input means to non-destructively interrogate the stored information.

It is the general object of the invention to avoid and overcome the foregoing and other difficulties of the prior art practices by the provision of a simple, and a compact magnetic core which is capable of performing the logical equality function operation $A \cdot B \; U \; \bar{A} \cdot \bar{B}$ all within the core structure.

Another object of the invention is to provide a single magnetic core which will make a comparison between two variable inputs at a high repetition rate.

Another object of the invention is to provide a magnetic memory device which is capable of storing information, of receiving new information, and of having non-destructive readout.

Another object of the invention is to provide a logic element which is radiation resistant and shock resistant.

The exact nature of this invention as well as other objects and advantages thereof will be readily apparent from consideration of the following specification relating to the annexed drawing in which.

Figure 1:
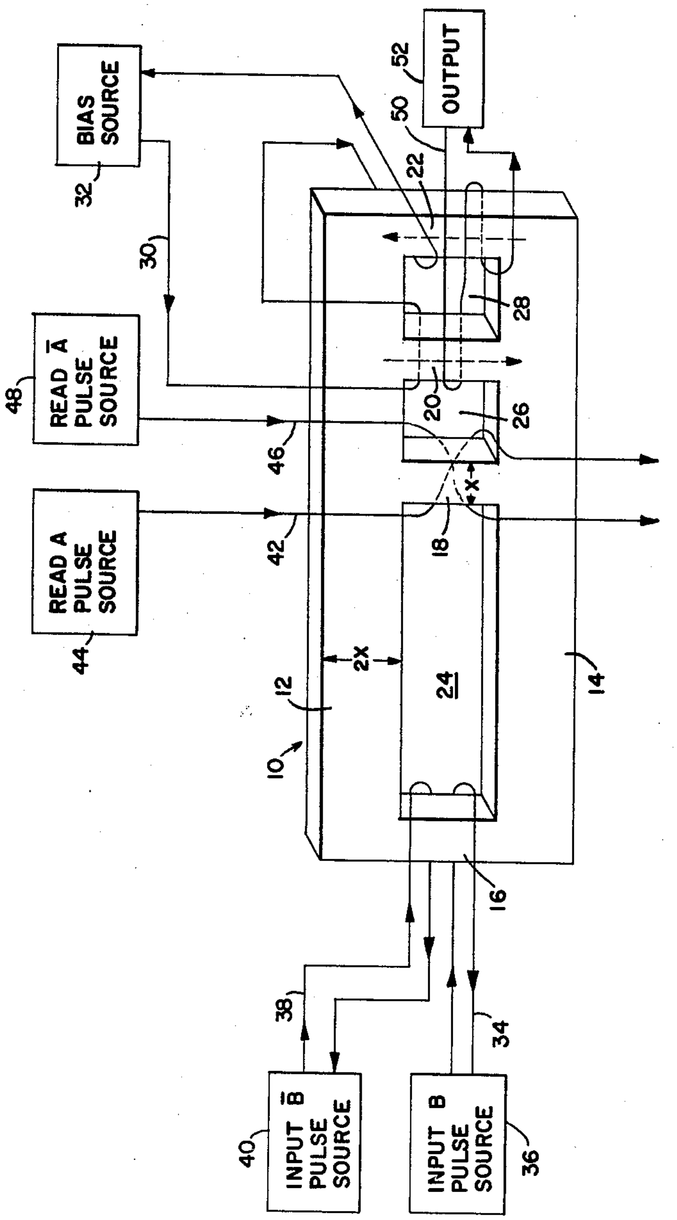
FIGURE 1 is a diagrammatic showing of a multi-aperture memory core structure together with the windings necessary to store information in the core and interrogate the core non-destructively.

Referring now to the drawings, there is shown in FIGURE 1 a rectangular ferrite magnetic core 10. The magnetic material forming the magnetic core preferably has a substantially square or rectangular hysteresis characteristic. The magnetic core 10 has a geometric configuration which has uniform thickness, spaced parallel body portions 12 and 14, first leg portion 16, second leg portion 18, third leg portion 20, and fourth leg portion 22. The width X of leg portion 18 is one-half the width of the body portion 12. The total width of the four legs is equal to the width of the two body portions. The width of the respective leg portions is equal and the width of the respective body portions is equal. The lateral distance between the second and third leg portion is substantially equal to the lateral distance between the third and fourth leg portions. The lateral distance between the first and second leg portions is slightly greater than the lateral distance between the second and fourth leg portions.

The respective body portions and leg portions define a magnetic core having a first aperture 24, second aperture 26, and a third aperture 28. The area of the first aperture is substantially about four times the area of the second aperture. The area of the second aperture is substantially equal to the area of the third aperture.

A bias winding 30 encompases the leg portions 20 and 22. A bias source 32 connected to the bias winding 30 produces a bias current in the bias winding. The bias current in the bias winding establishes a flux pattern in the leg portions 20 and 22 as shown by the arrows. The bias current can comprise a pulse applied during the interrogation operation or can be a direct current which is continuously applied to the bias winding. The bias current must be sufficiently large to drive each leg portion into saturation.

A first input winding 34 encompasses the leg portion 16 of the magnetic core. An input B pulse source is coupled to the input winding 34. A second input winding 38 encompasses the leg portion 16 of the magnetic core. An input $\overline{B}$ pulse source 40 is operatively coupled to the second input winding 38. The flux pattern established in the core by current pulses applied to the input windings by the input sources will be hereinafter described in detail.

A first read winding 42 surrounds the second leg portion 18 of the magnetic core. A read A pulse source 44 is operatively coupled to the read winding 42. A second read winding 46 surrounds the leg portion 18 of the magnetic core in a direction which is opposed to the winding 42. A read $\overline{A}$ pulse source 48 is operatively connected to the read winding 46.

An output winding 50 is arranged in a figure 8 pattern around the leg portions 20 and 22 of the magnetic core. An output utilization device 52 is coupled to the output winding 50. A change of the flux pattern in either of the leg portions 20 or 22 caused by a current pulse in the read windings will induce a voltage in the output winding 50.

Figure 2:
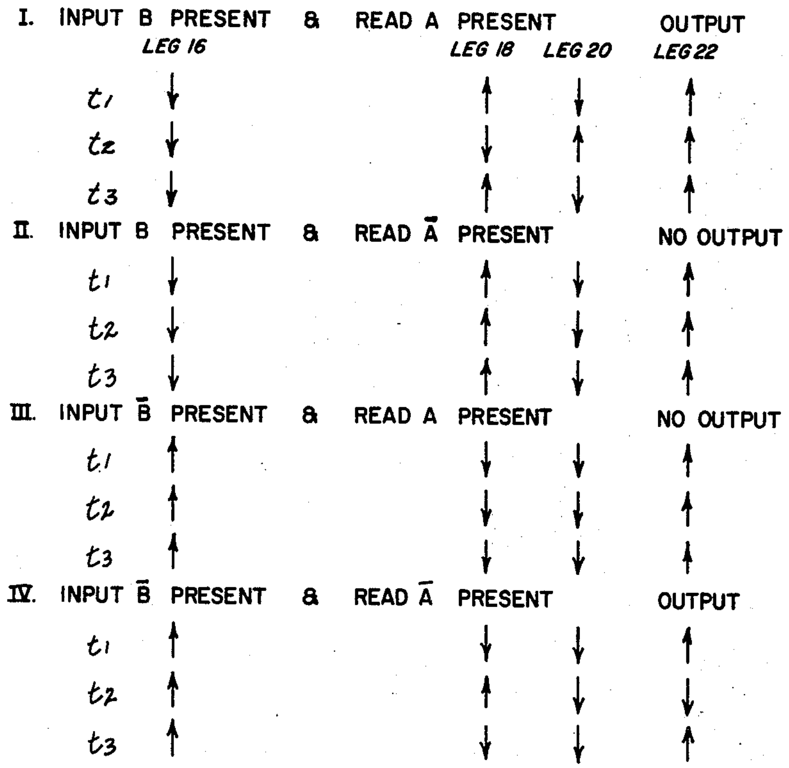
FIGURE 2 is a diagram of the magnetic flux patterns in the particular leg portions of the core of FIGURE 1.

The diagram of FIGURE 2 illustrates the flux patterns in the respective leg portions of the MALE. The operation of the multi-aperture logic element will be described in conjunction with this diagram. In Table I at time $t_1$ an input current pulse B in the first input winding 34 produces a downwardly directed flux pattern in leg portion 16 and an upwardly directed flux pattern in leg portion 18. The bias current in the bias winding 30 produces a downwardly directed flux pattern in leg 20 and an upwardly directed flux pattern in leg 22. The direction of the flux in leg portions 16 and 18 established by the input current B applied to the winding 34 is indicative of information stored in the MALE. At time $t_2$ a read current pulse is supplied to the read winding 42 to switch the flux pattern in the leg portions 18 and 20. The flux pattern in the leg portion 18 is downward and the flux pattern in the leg portion 20 is upward. The change in the flux pattern in the leg portion 20 induces a voltage in the output winding 50. At time $t_3$ the reading current pulse is removed thus enabling the bias current to switch the flux pattern in leg portions 20 and 22 back to their initial status. That is, that the flux pattern in leg portion 20 is downward and the flux pattern in the leg portion 22 is upward. An output signal is obtained when an input B current pulse and a read A current pulse is present.

In Table II at time $t_1$ with an input B current pulse in the input winding 34 the flux pattern in leg 16 is downward and the flux pattern in leg 18 is upward. The bias current in the bias winding 30 establishes a downwardly directed flux pattern in the leg portion 20 and an upwardly directed flux pattern in the leg portion 22. At time $t_2$ with a read $\overline{A}$ current pulse in the read winding 46 the flux pattern in the leg portions 20 and 22 are not changed. Accordingly, there is no output signal. At time $t_3$ the read $\overline{A}$ current pulse is removed and the flux pattern in the respective legs remains the same. The lack of flux change results because the leg portions are already saturated with flux in the sense in which the magnetizing force of the current in the windings 42 and 46 tends to increase the flux flow. In this condition there is substantially no flux change and substantially no output voltage is induced in the output winding 50.

In Table III at time $t_1$ with an input $\overline{B}$ current pulse present in the input winding 38 the flux pattern in the leg portion 16 is upward and the flux pattern in the leg portion 18 is downward. The bias current in the bias winding 30 produces a downward flux pattern in the leg portion 20 and an upward flux pattern in the leg portion 22. At time $t_2$ with a read A current pulse present in the winding 42 the flux pattern in the leg portions 20 and 22 does not change as the magnetizing force of the read A pulse current tends to increase the flux flow in the respective leg portions. At time $t_3$ the removal of the read A pulse current does not affect the flux pattern in the respective leg portions. An output signal is not obtained when there is an input $\overline{B}$ current pulse and a read A current pulse acting on the MALE.

In Table IV at time $t_1$ with an input $\overline{B}$ current pulse present in the winding 38 the flux pattern in the leg portion 16 is upward and the flux pattern in the leg portion 18 is downward. The bias current in the bias winding 30 produces a downward flux pattern in the leg portion 20 and an upward flux pattern in the leg portion 22. At time $t_2$ with a read $\overline{A}$ current pulse present in the winding 46 the flux pattern in the leg portion 18 is switched upward and the flux pattern in the leg portion 22 is switched downward. At time $t_3$ the read $\overline{A}$ current pulse is removed permitting the bias current to switch the flux patterns back to their initial status. The flux pattern change in the leg portion 22 of the MALE induces a voltage in the output winding 50. An output signal is obtained when an input $\overline{B}$ current pulse and a read $\overline{A}$ current pulse acts on the MALE.

Once the input B or $\overline{B}$ current pulse establishes a flux pattern in the MALE, the continuous interrogation of the MALE with either the read A or $\overline{A}$ current pulse does not destroy the initial flux pattern. The read pulses operate to non-destructively interrogate the stored information represented by the flux pattern.

Figure 3:
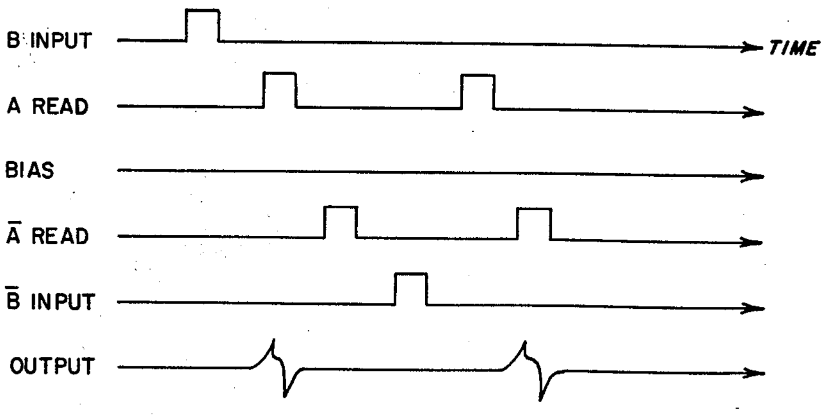
FIGURE 3 is a timing diagram useful in explaining the operation of the memory device of FIGURE 1.

FIGURE 3 graphically shows the timing sequence of the input pulses and read pulses which produces an output signal. An input B pulse coupled with an A read pulse produces an output signal. An input $\overline{B}$ pulse coupled with a read $\overline{A}$ pulse produces a signal. It is apparent from the timing diagram of FIGURE 3 that the improved multi-apertured logic element disclosed is operative to perform the logic equality function operation $A \cdot B \; U \; \overline{A} \cdot \overline{B}$ all within the magnetic ferrite structure. Furthermore, the MALE under actual operating conditions has an output signal to noise ratio of at least 40 to 1.

The device can also perform the logical exclusive or operation $A \cdot \overline{B} \; U \; \overline{A} \cdot B$. This is accomplished by having read "A" pulse source 44 drive winding 46 and read "$\overline{A}$" pulse source 48 drive winding 42.

While there have been shown and described and pointed out the fundamental novel features of the invention as applied to a preferred embodiment, it will be understood that various omissions, substitutions, changes in the form, and details of the device illustrated and its operation may be made by those skilled in the art, without departing from the spirit of the invention. It is the intention, therefore, to be limited only as indicated by the scope of the following claims.

What is claimed is:

1. A magnetic memory device including a closed magnetic circuit having two stable magnetic states and defining a plurality of flux paths, means for saturating one of said flux paths to represent a stored bit of information, bias means for saturating at least two of the remaining flux paths in predetermined directions, means for reversing the direction of the flux in at least one of the biased flux paths upon application of an input signal representing an input bit of information only when said input bit of information indicates non-compare to the stored bit of information without destroying the flux path representing the stored bit of information, and means for sensing a flux change in the biased flux paths.

2. A magnetic circuit comprising a magnetic core having a pair of spaced body portions separated by first, second, third and fourth leg portions, the cross-sectional area of each leg portion being one-half the cross-sectional area of a body portion, and the distance between the second and third leg portions being substantially equal to the distance between the third and fourth leg portions and the distance between the first and second leg portions being greater than the distance between the second and fourth leg portions, bias means for saturating the third and fourth leg portions in predetermined directions, means linked with the second leg portion for selectively reversing the direction of the flux in the third and fourth leg portions, and means for sensing a flux change in either the third or fourth leg portion.

3. A magnetic circuit capable of non-destructive comparison of a stored variable bit of information with an input variable bit of information comprising
a core of magnetic material capable of having two stable magnetic states stored therein at any one instant of time,
said core including a first, second, third and fourth leg portion, each leg portion being of substantially equal cross section, the lateral distance between the second and third leg portions being substantially equal to the lateral distance between the third and fourth leg portions and the lateral distance between the first and second leg portions being greater than the lateral distance between the second and fourth leg portions so that the flux path described by the first and second leg portions is longer than the flux path described by the second and fourth leg portions,
bias winding means surrounding the third and fourth leg portions adapted to carry current to set a stable flux pattern therearound,
winding means surrounding the first leg portion adapted to carry current representing a stored variable bit of information to set a stable flux pattern around said first and second leg portions,
winding means surrounding said second leg portion adapted to carry current representing an input variable bit of information to change the flux pattern around said third and fourth leg portions if the input variable bit of information compares to the stored variable bit of information represented by the flux pattern around said first and second leg portions, and
output winding means surrounding the third and fourth leg portions adapted to detect flux changes therein.

4. In a magnetic circuit capable of non-destructive comparison of an input variable bit of information with a stored variable bit of information the combination of
a single multi-aperture logic element having the capability of maintaining two stable magnetic states at any one instant of time, said element including four separate portions,
means to establish a flux path representing a variable stored bit of information around the first and second portions of said element,
means to establish a known bias flux path around the third and fourth portions of said element,
means to sequentially introduce a flux pattern representing an input variable bit of information into said second portion of said element which will effect flux changes to the biased flux path pattern in the third and fourth portions of said element if said input variable bit of information compares with said stored variable bit of information, and
means for sensing any flux path changes in the third and fourth portions of the element whereby the circuit exclusively produces an output signal anly when the input variable bit of information compares to the stored variable bit of information.

5. In a magnetic circuit the combination of
a magnetic core having a plurality of apertures therethrough defining a plurality of flux paths,
means for saturating one of said flux paths to represent a stored bit of information,
bias means for saturating two other flux paths in predetermined directions,
means linked with the flux path representing the stored bit of information for sequentially selectively reversing the direction of the flux in the biased paths upon input signals representing input bits of information which compare to the stored bits of information of the said one flux path, and
means for sensing a flux change in the biased flux paths.

6. A magnetic circuit comprising a magnetic core having a pair of spaced body portions separated by first, second, third and fourth leg portions, the cross-sectional area of each leg portion being less than the cross-sectional area of a body portion, and the distance between the second and third leg portions being substantially equal to the distance between the third and fourth leg portions and the distance between the first and second leg portions being greater than the distance between the second and fourth leg portions, bias means for saturating the third and fourth leg portions in pre-determined directions, means linked with the second leg portion for selectively reversing the direction of the flux in the third and fourth leg portions, and means for sensing a flux change in either the third or fourth leg portion.

7. A magnetic circuit capable of comparing a stored variable bit of information with an input variable bit of information without destroying the stored variable bit of information comprising a single multi-aperture logic element, said element including four separate portions, means to establish a flux path pattern in the first and second portions of the element to represent the stored variable bit of information, means establishing a predetermined known flux path pattern in the third and fourth portions of the element, means for introducing the input variable bit of information after the aforesaid flux patterns have been established in the four separate portions to change the flux path pattern in either the second and third portions of the element or the second and fourth portions of the element, and means for sensing the flux path changes in the third and fourth portions of the element whereby the device exclusively produces an output signal when the input variable bit of information compares with the stored variable bit of information.

References Cited by the Examiner

UNITED STATES PATENTS

| | | | |
|---|---|---|---|
| 2,978,176 | 4/61 | Lockhart | 340—174 |
| 3,077,582 | 2/63 | Bauer | 340—174 |
| 3,077,583 | 2/63 | Russell | 340—174 |

IRVING L. SRAGOW, *Primary Examiner.*